(12) United States Patent
Sareen et al.

(10) Patent No.: US 8,473,670 B2
(45) Date of Patent: *Jun. 25, 2013

(54) BOOT MANAGEMENT OF NON-VOLATILE MEMORY

(75) Inventors: Bhrighu Sareen, Redmond, WA (US); Dilesh Dhokia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,344

(22) Filed: Nov. 2, 2011

(65) Prior Publication Data

US 2012/0047323 A1    Feb. 23, 2012

Related U.S. Application Data

(63) Continuation of application No. 12/055,315, filed on Mar. 26, 2008, now Pat. No. 8,082,384.

(51) Int. Cl.
*G06F 12/00* (2006.01)

(52) U.S. Cl.
USPC .................................. 711/103; 711/E12.008

(58) Field of Classification Search
USPC .......................................................... 711/103
See application file for complete search history.

(56) References Cited

U.S. PATENT DOCUMENTS

| | | | |
|---|---|---|---|
| 5,535,357 A | 7/1996 | Moran et al. | |
| 5,860,083 A * | 1/1999 | Sukegawa | 711/103 |
| 6,018,806 A | 1/2000 | Cortopassi et al. | |
| 6,192,488 B1 | 2/2001 | Li | |
| 6,308,265 B1 | 10/2001 | Miller | |
| 7,010,662 B2 | 3/2006 | Aasheim et al. | |
| 7,017,037 B2 | 3/2006 | Fortin et al. | |
| 7,110,437 B2 | 9/2006 | Oates et al. | |
| 7,162,549 B2 | 1/2007 | Mambakkam et al. | |
| 7,186,147 B1 | 3/2007 | Chou et al. | |
| 7,716,411 B2 | 5/2010 | Panabaker et al. | |
| 8,082,384 B2 | 12/2011 | Sareen | |
| 8,151,064 B2 | 4/2012 | Lee | |
| 8,195,878 B2 | 6/2012 | Mittendorff et al. | |
| 8,307,014 B2 | 11/2012 | Mehrotra et al. | |
| 2005/0027928 A1 | 2/2005 | Avraham et al. | |

(Continued)

FOREIGN PATENT DOCUMENTS

| | | |
|---|---|---|
| CN | 1967504 | 5/2007 |
| WO | WO-2009120423 | 10/2009 |

OTHER PUBLICATIONS

"Final Office Action", U.S. Appl. No. 12/055,315, (Jun. 24, 2011), 6 pages.

(Continued)

*Primary Examiner* — Reginald Bragdon
*Assistant Examiner* — Aracelis Ruiz
(74) *Attorney, Agent, or Firm* — Wolfe-SBMC

(57) ABSTRACT

A BIOS may provide bad block and wear-leveling services to a flash memory during a boot cycle until a full-functioned memory controller, such as a software memory controller, is available. After the full-functioned memory controller is available, the controller may use data passed by the BIOS to determine what, if any, steps to take to account for write activity during the boot process. Alternatively, the BIOS may use a reserved portion of flash memory so that wear leveling for boot-related data, such as a shut-down flag, is not needed.

20 Claims, 6 Drawing Sheets

U.S. PATENT DOCUMENTS

| | | |
|---|---|---|
| 2005/0044348 A1 | 2/2005 | O'Connell |
| 2005/0204091 A1 | 9/2005 | Kilbuck et al. |
| 2006/0004971 A1 | 1/2006 | Kim et al. |
| 2006/0031710 A1* | 2/2006 | Jo .................................. 714/5 |
| 2006/0075284 A1 | 4/2006 | Skan et al. |
| 2006/0109725 A1 | 5/2006 | Yoon et al. |
| 2006/0239075 A1 | 10/2006 | Williams et al. |
| 2006/0291304 A1 | 12/2006 | Rothman et al. |
| 2007/0050536 A1 | 3/2007 | Kolokowsky |
| 2007/0300008 A1 | 12/2007 | Rogers et al. |
| 2008/0082736 A1 | 4/2008 | Chow et al. |
| 2009/0100215 A1 | 4/2009 | Nochimowski |
| 2009/0106484 A1 | 4/2009 | Yeh et al. |
| 2009/0249052 A1 | 10/2009 | Sareen |
| 2010/0082879 A1 | 4/2010 | Mckean et al. |
| 2010/0268866 A1 | 10/2010 | Colligan |
| 2011/0138106 A1 | 6/2011 | Prabhakaran et al. |
| 2012/0233386 A1 | 9/2012 | Tong et al. |
| 2012/0239859 A1 | 9/2012 | Lary et al. |
| 2012/0290774 A1 | 11/2012 | Trika |
| 2012/0317337 A1 | 12/2012 | Johar et al. |

OTHER PUBLICATIONS

"International Search Report", PCT/US2009/034199, (Oct. 1, 2009), 3 pages.

"Non-Final Office Action", U.S. Appl. No. 12/055,315, (Mar. 7, 2011), 9 pages.

"Notice of Allowance", U.S. Appl. No. 12/055,315, (Aug. 16, 2011), 8 pages.

"Wear Leveling", Available at <http://www.storagereview.com/guide/featuresLeveling.html>, (May 16, 2007), 2 pages.

"Written Opinion", PCT/US2009/034199, (Oct. 1, 2009), 3 pages.

Baggett, Ivan "DOS Stamp Users Manual", Retrieved from http://www.bagotronix.com/stmpman.pdf on Aug 11, 2009, (Feb. 16, 2001), p. 19.

Jex, Jerry "Flash Memory Bios for PC and Notebook computers", *Communications, Computers and Signal Processing*, 1991., IEEE Pacific Rim Conference, (May 9, 1991), p. 692-695.

Sandisk, "DiskOnChip 2000 DIP from 16MByte to 1GByte", *Data Sheet*, (Mar. 2006), pp. 1-29.

"Foreign Office Action", Chinese Application No. 200980111459.6, (Oct. 10, 2012), 9 pages.

"SSD Performance, HDD Capacity, Affordable Price", Retrieved from <http://www.seagate.com/internal-hard-drives/laptop-hard-drives/momentus-xt-hybrid/> on Feb. 5, 2013, (Nov. 2012), 2 pages.

"WD® Creates World's Thinnest 2.5-inch Hybrid Hard Drive", Retrieved from <http://www.prnewswire.com/news-releases/wd-creates-worlds-thinnest-25-inch-hybrid-hard-drive-169157916.html> on Feb. 5, 2013, (Sep. 10, 2012), 2 pages.

Chen, et al., "Hystor: Making the Best Use of Solid State Drives in High Performance Storage Systems", *Proceedings of the 25th International Conference on Supercomputing*, Available at <http://www.cse.ohio-state.edu/~fchen/paper/papers/ics11.pdf>, (May 31, 2011), 11 pages.

Joo, et al., "FAST: Quick Application Launch on Solid-State Drives", *Proceedings of the 9th USENIX Conference on File and Storage Technologies*, Available at <http://static.usenix.org/event/fast11/tech/full_papers/Joo.pdf>, (Feb. 15, 2011), 14 pages.

Li, et al., "An Efficient SSD-based Hybrid Storage Architecture for Large-Scale Search Engines", *Proceedings of 41st International Conference on Parallel Processing (ICPP)*, Available at <http://idc.hust.edu.cn/~rxli/publications/2012/ICPP12_SSD-IR-Cache.pdf>, (Sep. 10, 2012), 10 pages.

Saxena, et al., "FlashTier: A Lightweight, Consistent and Durable Storage Cache", *Proceedings of the 7th ACM European conference on Computer Systems*, Available at <http://pages.cs.wisc.edu/~swift/papers/eurosys12_flashtier.pdf>, (Apr. 10, 2012), 14 pages.

* cited by examiner

US 8,473,670 B2

BOOT MANAGEMENT OF NON-VOLATILE MEMORY

RELATED APPLICATION

This application is a continuation of and claims priority to U.S. patent application Ser. No. 12/055,315, entitled "Booting an Electronic Device Using Flash Memory and a Limited Function Memory Controller," now U.S. Pat. No. 8,082,384, filed on Mar. 26, 2008, the disclosure of which is incorporated in its entirety by reference herein.

BACKGROUND

Flash memory differs from many other types of non-volatile memory in that it has a limited and predictable lifetime. While a hard disk may experience random location failures over its life, a flash memory may have a limit of tens of thousands of write cycles for each memory location. To accommodate such a limited life, a memory controller may incorporate a technique for wear-leveling, that is, invoking a mapping function to point data destined for a logical address to a movable physical location. When a given physical address reaches a threshold number of writes, the mapping function will remap the logical address to a different physical location.

The wear-leveling function is normally carried out by a full-function memory controller, or in some cases, an advanced flash memory with built-in wear-leveling circuitry. However, in a cost sensitive implementation, reliance on either of these options may be cost prohibitive. While software memory controllers or interface drivers may provide a wear-leveling solution for a fully operational electronic device, the issue of wear-leveling during a boot cycle may still need to be addressed separately because of the critical nature of the boot process and the need to protect flash memory during this early phase of electronic device operation before such controllers or drivers are in place.

SUMMARY

Wear-leveling during a boot process may be performed by a specialized BIOS that can manage flash memory in the absence of a specialized controller or driver, as may be the case in an extremely cost-sensitive environment. In one embodiment, the BIOS may defer boot-related writes to the flash until a full-functioned memory controller is active. In another embodiment, the BIOS may flag memory locations that are written to so that a full function memory controller can evaluate and wear level those locations as necessary. In yet another embodiment, the BIOS may perform flash memory services similar to those of the full-functioned memory controller, so that as the full-functioned memory controller becomes active a seamless transition may be performed. Another embodiment may dedicate a portion of the flash memory solely to boot process support so that the dedicated portion of memory does not exceed write limits through usage caused by other programs.

Flash memory services may include both wear leveling service and bad block management. Wear leveling services may include memory monitoring a number of write cycles for each memory location and memory mapping to distribute write operations across the physical flash memory so that no single or group of memory locations exceeds specified write limits will be for another. Bad block management notes memory locations that either are nonfunctional or have exceeded specified write limits.

DETAILED DESCRIPTION

Although the following text sets forth a detailed description of numerous different embodiments, it should be understood that the detailed description is to be construed as exemplary only and does not describe every possible embodiment. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the discussed embodiments, further discussion of such software and ICs, if any, will be limited to the essentials with respect to the principles and concepts of the claimed embodiments.

Figure 1:
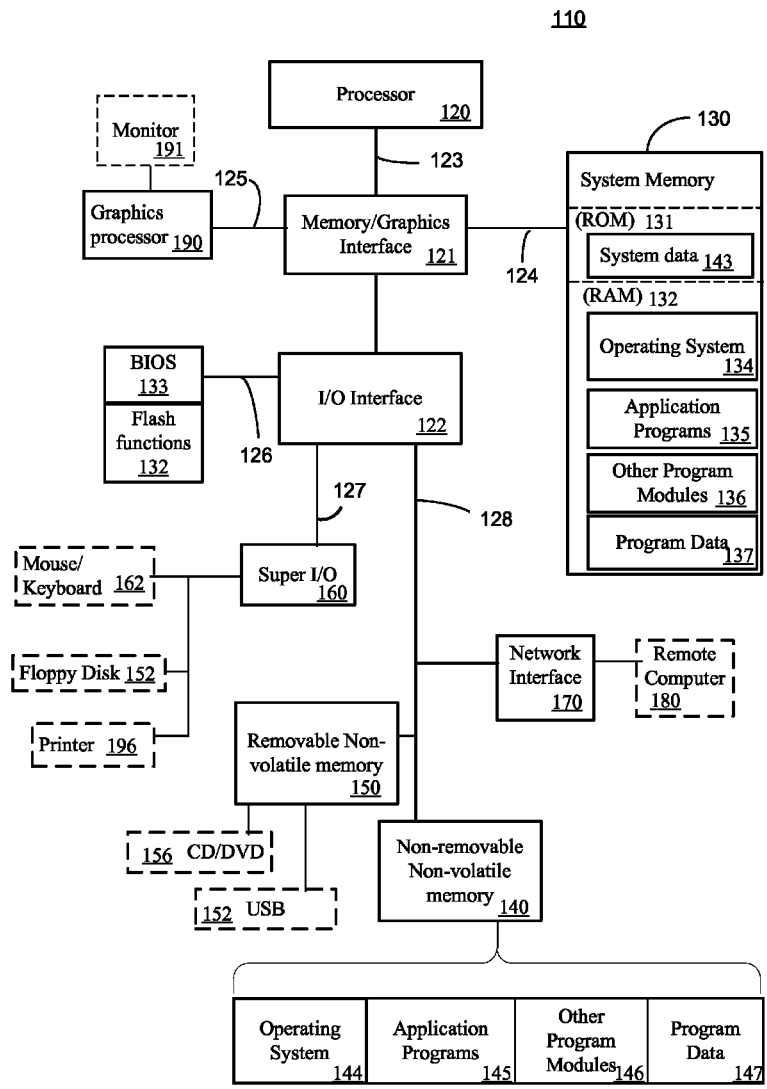
FIG. 1 is a block diagram of an electronic device in the form of a computer supporting BIOS management of flash memory.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer storage media, however, are configured to store information and thus do not include communication media and transitory signals.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

In some embodiments, a security module 129 may be incorporated to manage metering, billing, and enforcement of policies, such as ensuring certain programs are running. The security module 129 is discussed more below, especially with respect to FIG. 2. In various embodiments the security module 129 is coupled to the I/O interface 122 via the SPI bus 126, the system bus 123, or both. In some cases, where the processor architecture allows, a connection 181 between the security module 129 and the processor 120 may allow the security module 129 to use a hardware debug/test access port (not depicted) on the processor. Hardware debug ports exist in various brands of processors and allow direct read out of internal registers in the processor. In Intel processors, the hardware debug port is called a test access port (TAP) and in AMD processors, it is called a Hardware Debug Tool (HDT) debug port. The use of such ports by the security module 129 is discussed below.

A super input/output chip 160 may be used to connect to a number of 'legacy' peripherals, such as floppy disk 152, keyboard/mouse 162, and printer 196, as examples. The super I/O chip 122 may be connected to the I/O interface 121 with a low pin count (LPC) bus, in some embodiments. The super I/O chip 121 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
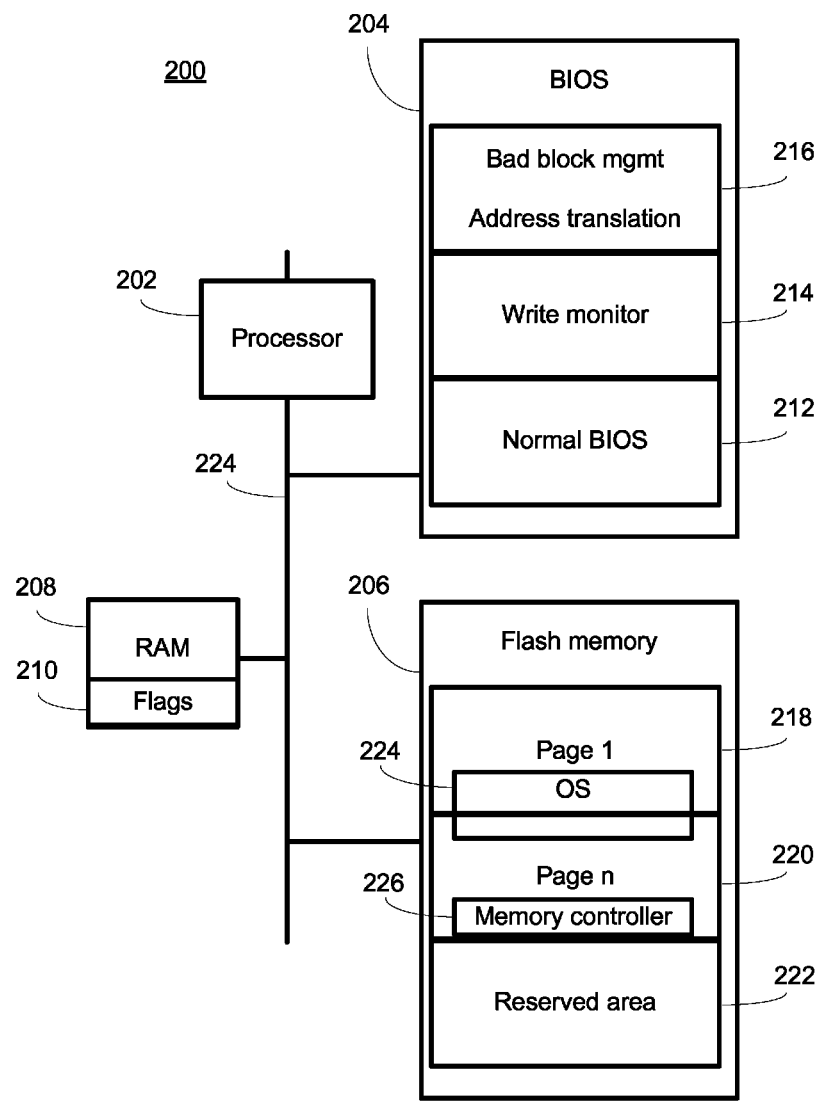
FIG. 2 is a block diagram of an electronic device showing details of various memories.

FIG. 2 is a block diagram of an electronic device 200, similar to the electronic device of FIG. 1, focusing on portions of volatile and non-volatile memory. The electronic device 200 may include a processor 202, a basic input/output system memory 204 (BIOS) stored in a non-volatile memory, a flash memory 206, and random access volatile memory 208 (RAM).

The processor 202 may execute computer-readable instructions stored in the BIOS 204, the flash memory 206, or downloaded from another source into the RAM 208.

The BIOS 204 may include normal functions 212, such as input and output routines used for both initial startup and by an operating system to accomplish low level tasks in a conventional manner. The BIOS 204 may also include capabilities not normally associated with BIOS functions. For example, the BIOS 204 may perform management functions for the flash memory 206, such as wear-leveling, bad block management, or both, during a boot process in the absence of a full-featured memory controller, such as interface 150 of FIG. 1. To support flash memory management before such wear-leveling or memory controller functions are available, the BIOS 204 may include a write monitor 214 that observes attempts to write to the flash memory 206, and a bad block management and address translation function 216 that maintains a list of non-functioning addresses in the flash memory 206 and that also maintains a mapping table of logical-to-physical memory locations for the purpose of redirecting write activity to lesser used physical locations.

The flash memory 206 may be divided into pages of memory, for example, a first page 218, and one or more additional pages represented by page n 220. A reserved area 222 may be a dedicated page, or simply a dedicated range of memory reserved for use by the BIOS 204, as discussed in more detail below. The flash memory 206 may store computer-executable instructions for implementing programs, drivers, utilities, etc., such as an operating system 224 and a software memory controller 226.

In operation, an electronic device, such as computer 110, that relies on flash memory 206 for a portion of system non-volatile memory, may use wear-leveling to distribute write operations among available working physical memory locations in a flash memory or similar structure.

The write monitor 214 portion of the BIOS 204 may be a module that monitors write activity and coordinates adjustment of mapping table entries maintained by the address translation function 216, based on previous write activity to physical locations of the flash memory.

In one alternate embodiment, the write monitor 214 may simply postpone boot-phase writes until after the full-featured memory controller is active. One example of such an embodiment may have the BIOS redirect write operations targeting the flash memory 206 to the RAM 208 prior to the wear-leveling service being active. When flash memory services are available, for example, through a software memory controller 226, the data stored in the RAM 208 may be written to the flash 206 under the managed environment. In a related embodiment, the BIOS may perform memory mapping for the flash memory 206 but defer writes during the boot-cycle until after a wear-leveling service of the memory controller 226 is active. In this case, the BIOS may duplicate the operation of the flash memory management functions of the memory controller 226 so that a seamless transfer of activity can be performed between the two services. For example, the memory mapping functions may be duplicated and each may share a common area of memory for maintaining the memory map and bad block table or tables.

In another embodiment, the BIOS may simply direct boot-related write activity to the reserved area 222 of the flash memory 206. The reserved area 222 may be excluded from wear-leveling performed by either initial BIOS services or by flash memory services provided by the memory controller 226, when available. Such a strategy may depend on two assumption related to booting a computer. The first is that boot-related write activity may be limited in scope, so that only a small portion of memory needs to be reserved, so that the cost of the reserved memory is not prohibitive. The second relies on the number of boot-related writes to be less than the lifetime of the memory being reserved. For example, it may be reasonable to assume that a computer may be booted less than 100,000 times over its life, which is well less than the durability specification for most current technology flash memories.

In another embodiment, the write monitor 214 may monitor data written to a page of memory via a system memory interrupt, such as Interrupt 13 supported by some BIOS versions, and sets a flag associated with the page of memory, e.g. page 1 218. The flag may be used by the full-featured memory controller 226, when active, to perform wear leveling on that page. For example, a wear-leveling table that tracks a number of writes to each memory location may be updated to reflect writes that occurred before the memory controller 226 was active.

In one embodiment, the write monitor 214 and the bad block management and address translation function 214 may be implemented in an option read-only memory associated with the execution of the BIOS 204.

Figure 3:
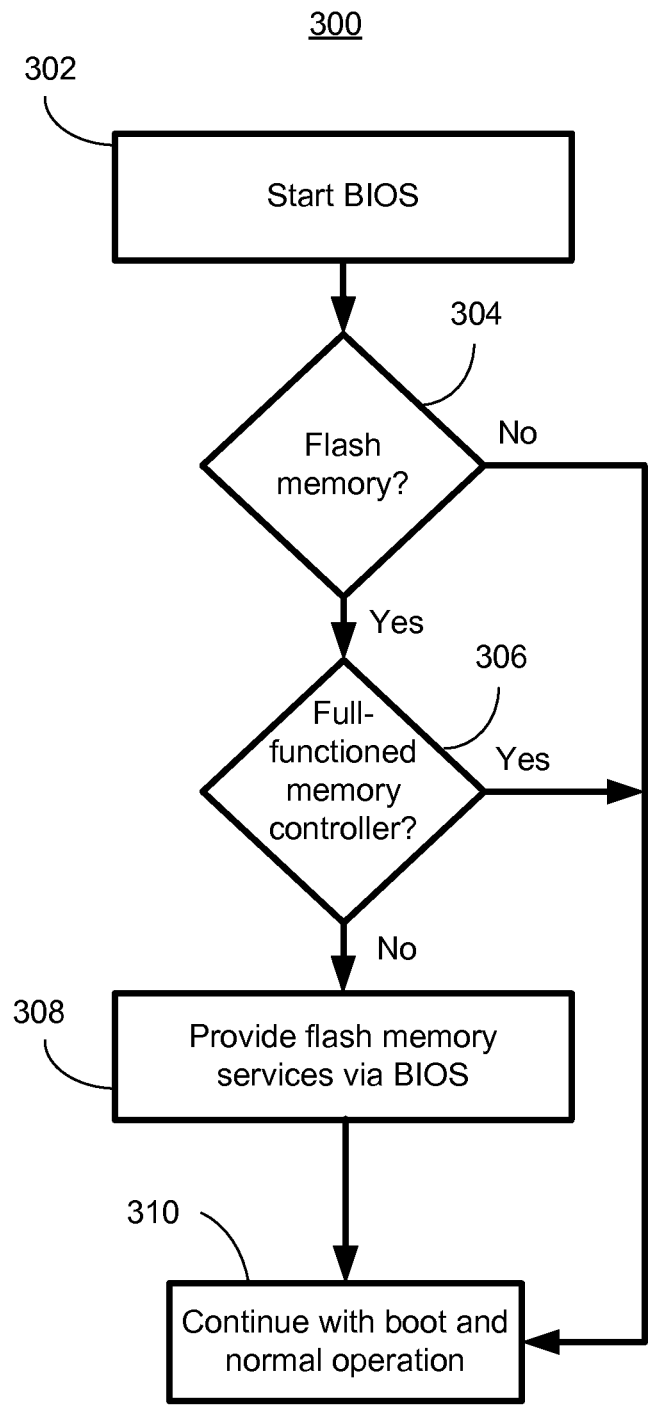
FIG. 3 is a method of booting using a BIOS to support boot from a flash memory.

FIG. 3 illustrates a method 300 of booting an electronic device 200 in the absence of a component, such as a memory controller 226, providing wear-leveling and other memory management functions.

At block 302, the electronic device may be activated, either from a power-off state or as part of a warm boot/restart. A basic input/output system (BIOS) 204 program may be activated as part of starting the electronic device, the BIOS providing low level support for peripherals and access to memory.

At block 304, the BIOS may determine whether it is operating with a flash memory 206. It may be that the BIOS is also stored in a flash memory, but the determination is not necessarily tied to the BIOS being run from a flash memory. Rather, the determination may be that subsequent memory access activity, such as access to a boot loader and ultimately the operating system 224, is made to flash memory as opposed to, for example, a hard disk drive. If, at block 304, operation is from a flash memory 206, execution may follow the 'yes' branch from block 304 to block 306.

At block 306, the BIOS 204 may determine if a full function memory controller, such as one providing support for Interrupt 13, wear-leveling, address mapping, and bad block management, etc. is available. If not, the 'no' branch from block 306 may be taken to block 308.

At block 308, the BIOS may provide flash memory services until a full service memory controller, such as memory controller 226 is available. A discussion of providing the flash memory services associated with block 308 are found below with respect to FIGS. 4-6.

After conclusion of flash memory services being provided by the BIOS 204, execution as part of the normal startup routine may continue at block 310. Due to the nature of a typical boot process, some of the activities of block 310 may occur concurrently with other BIOS supported boot operations.

If, at block 304, no flash memory is in use, execution may continue at block 310.

If, at block 306, a full functioned memory controller is available to support flash memory operation, execution may continue at block 310.

Figure 4:
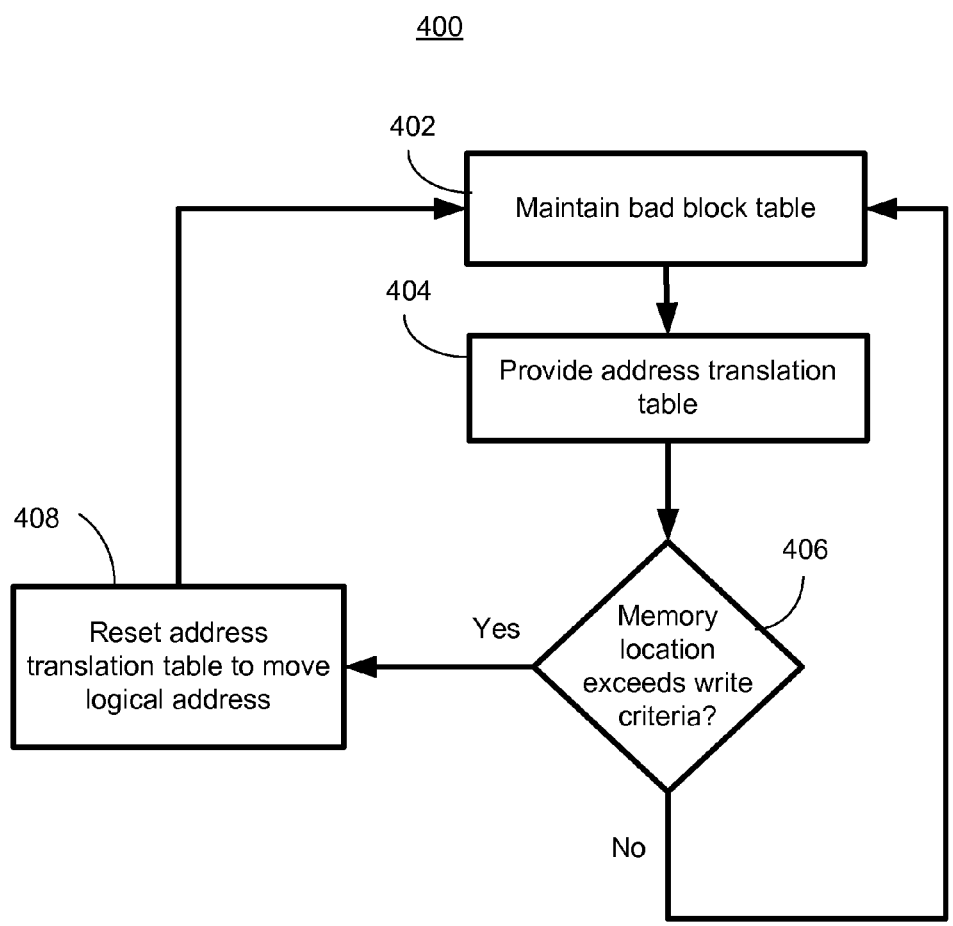
FIG. 4 is a method of performing flash memory services.

FIG. 4 illustrates a method 400 of providing flash memory services by a BIOS during a boot cycle of an electronic device. At block 402, a bad block table may be maintained by the BIOS. The bad block table may be used to mark memory addresses that are not functioning properly. The bad block table may be consulted during a write operation to determine whether it is safe to use a particular physical memory location.

At block 404, an address translation table may be maintained. The address translation table accepts requests for access to a logical address in the memory being maintained. The logical address may be mapped to a physical memory location in the memory device. As physical memory locations become overused from a write durability perspective, the logical-to-physical mapping may be changed to allow use of a less-used portion of physical memory.

At block 406, a determination of such usage may be made with respect to a current write request. If a requested memory location has exceeded the current activity criteria, the 'yes' branch may be taken to block 408.

At block 408, the address translation table may be updated to move the association with a current logical address to a different physical address and execution continued at block 402.

If at block 406, a write to a physical memory location will not exceed the write criteria, execution may follow the 'no' branch back to block 402. It should be noted that most flash memory wear occurs during the erase portion of a write cycle, because in many cases a higher voltage is used to erase data than to write and read it. Address translation for read operations may be appropriate in some embodiments, but this discussion is limited to write operations, for ease of illustration.

Figure 5:
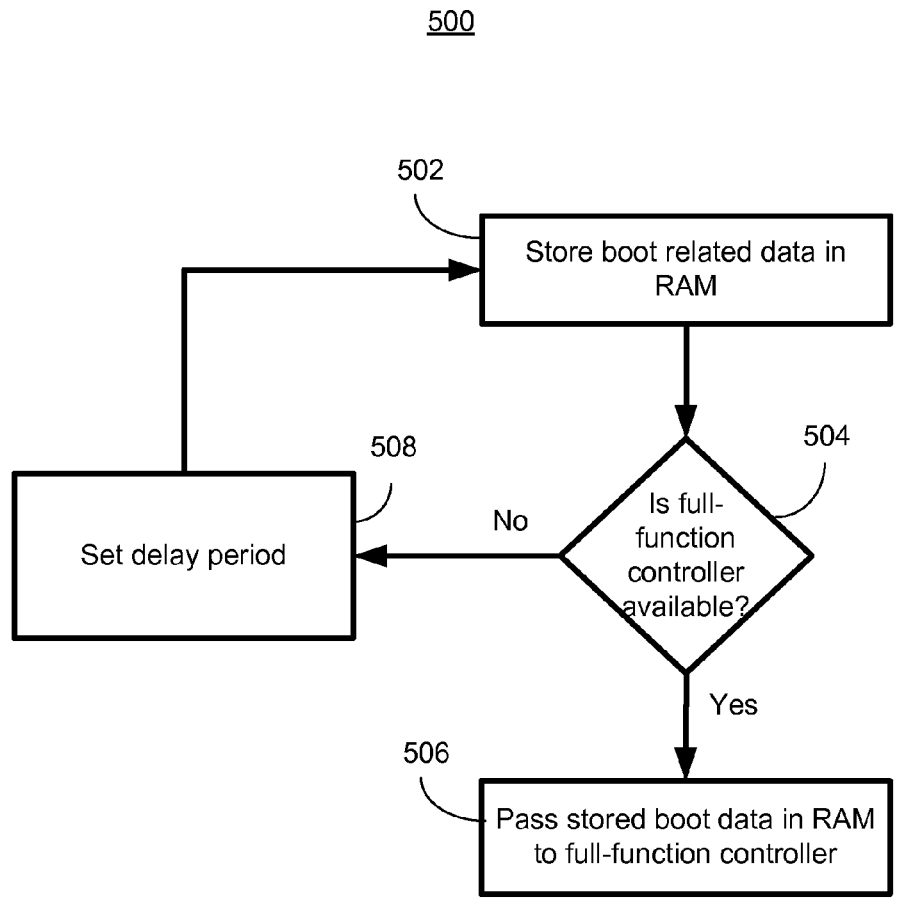
FIG. 5 is another method of performing flash memory services.

FIG. 5 illustrates an alternate method 500 of providing flash memory services by a BIOS during a boot cycle of an electronic device. At block 502, boot-related data that would normally be written to non-volatile memory, such as a hard disk, may be stored in RAM 208.

At block 504, a determination as to whether a software memory controller 226 supporting wear-leveling functions is available. If so, the 'yes' branch from block 504 may be taken to block 506.

At block 506, the boot-data stored in RAM 208 may be transferred to the flash memory 206 using the full-functioned controller, thereby applying wear-leveling and other services to the data written.

If, at block 504, the full-functioned memory controller is not yet available, the 'no' branch from block 504 may be taken to block 508. At block 508, a time delay or other software trigger may be set and operation continued at block 502. After the delay period or activation of the software trigger, execution may continue at block 504 as described above.

Figure 6:
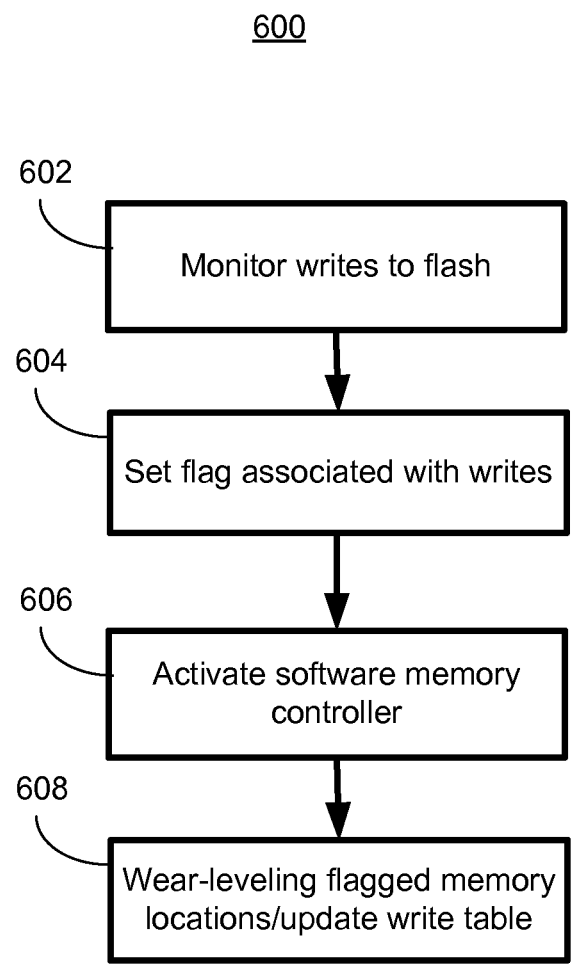
FIG. 6 is another method of performing flash memory services.

FIG. 6 illustrates yet another method 600 of providing flash memory services by a BIOS during a boot cycle of an electronic device. At block 600, the BIOS 204 may monitor a memory write performed via a system interrupt to a page of the flash memory 206.

At block 604 the BIOS may set a flag associated with the memory write. For example, a variable in RAM 208 may be written with a value corresponding to each boot-related memory write.

At block 606 a software memory controller 226 supporting flash memory wear-leveling may be activated.

At block 608, the software memory controller 226 may read the data stored in RAM related to boot-related write activity and update wear-leveling information associated with the page or pages of the flash memory 206. At block 608 the software memory controller 226 may update the wear tables associated with write activity to account for writes performed before the controller was active. Alternatively, the software memory controller 206 may move data to a new location if the controller 206 determines that a threshold limit for writes has been exceeded. The threshold limit may be an absolute limit derived from component durability specifications or may be a comparison to write activity at other locations.

Although the foregoing text sets forth a detailed description of numerous different embodiments, it should be understood that the scope of certain embodiments are defined by the words of the claims set forth at the end of this patent. The detailed description is to be construed as exemplary only and does not describe every possibly embodiment of the invention. Numerous alternative embodiments could be implemented, using either current technology or technology developed after the filing date of this patent, which would still fall within the scope of the claimed embodiments.

Thus, many modifications and variations may be made in the techniques and structures described and illustrated herein without departing from the spirit and scope of the claimed embodiments. Accordingly, it should be understood that the methods and apparatus described herein are illustrative only and are not limiting upon the scope of the claimed embodiments.

What is claimed is:

1. A method comprising:
   determining that a pre-boot functionality is accessing non-volatile memory;
   ascertaining, responsive to said determining, whether a component that is configured to provide non-volatile memory services is active; and providing one or more non-volatile memory services via the pre-boot functionality in response to ascertaining that the component that is configured to provide the non-volatile memory services is inactive.

2. A method as described in claim 1, wherein the pre-boot functionality comprises a basic input/output system (BIOS).

3. A method as described in claim 1, wherein the non-volatile memory comprises flash memory.

4. A method as described in claim 1, wherein the non-volatile memory services comprise at least one of wear-leveling or bad block management for the non-volatile memory.

5. A method as described in claim 1, wherein the non-volatile memory services comprise:
   maintaining a bad block table that includes memory addresses of the non-volatile memory that are determined to be not functioning properly; and
   consulting the bad block table as part of a write operation to the non-volatile memory to determine whether it is safe to write data to a particular memory location of the non-volatile memory.

6. A method as described in claim 1, wherein the non-volatile memory services comprise:
   maintaining an address translation table that maps logical memory addresses for the non-volatile memory to physical memory addresses for the non-volatile memory; and
   changing one or more mappings of the logical memory addresses to the physical memory addresses to implement wear leveling for the non-volatile memory.

7. A method as described in claim 1, wherein the non-volatile memory services comprise flagging a portion of the non-volatile memory to which data is written to enable the component to perform wear leveling on the portion of non-volatile memory when the component becomes active.

8. A method as described in claim 1, wherein the non-volatile memory services comprise postponing one or more writes to the non-volatile memory until it is determined that the component is active.

9. A method as described in claim 1, wherein the non-volatile memory services comprise performing boot-related data writes to a portion of the non-volatile memory that is reserved for boot-related data writes.

10. A method comprising:
    ascertaining that data is written to a portion of non-volatile memory; and
    flagging the portion of non-volatile memory in response to determining that a controller for the non-volatile memory is inactive to enable the controller to perform wear leveling on the portion of non-volatile memory when the controller becomes active.

11. A method as described in claim 10, wherein the non-volatile memory comprises flash memory and wherein said flagging is performed by a pre-boot functionality of a computing device.

12. A method as described in claim 11, wherein the pre-boot functionality comprises a basic input/output system (BIOS).

13. A method as described in claim 10, wherein said ascertaining comprises ascertaining that the data is written to the portion of non-volatile memory prior to or during a boot operation.

14. One or more computer storage media storing one or more modules that are executable by a computing device to perform, in response to a determination that a controller for non-volatile memory is inactive, at least one of wear-leveling or bad block management for the non-volatile memory during a boot process for the computing device.

15. One or more computer storage media as described in claim 14, wherein the one or more modules comprise a basic input/output system (BIOS) for the computing device.

16. One or more computer storage media as described in claim 14, wherein the one or more modules are configured to implement said wear-leveling by:
    maintaining an address translation table that maps logical memory addresses for the non-volatile memory to physical memory addresses for the non-volatile memory; and
    changing at least one mapping of a logical memory address to a physical memory address such that a data write to the logical memory address is redirected from the physical memory address to a different physical memory address.

17. One or more computer storage media as described in claim 16, wherein the one or more modules are configured to perform said changing in response to a number of data writes to the physical memory address exceeding a threshold number of data writes.

18. One or more computer storage media as described in claim 14, wherein the one or more modules are configured to implement said wear-leveling by flagging a portion of the non-volatile memory to which data is written to enable the controller to perform wear leveling on the portion of non-volatile memory when the controller becomes active.

19. One or more computer storage media as described in claim 14, wherein the one or more modules are configured to implement said bad block management by:
    maintaining a bad block table that includes memory addresses of the non-volatile memory that are determined to be not functioning properly; and
    consulting the bad block table as part of a write operation to the non-volatile memory to determine whether it is safe to write data to a particular memory location of the non-volatile memory.

20. One or more computer storage media as described in claim 14, wherein the one or more modules are further configured to performing boot-related data writes to a portion of the non-volatile memory that is reserved for boot-related data writes.

* * * * *